July 16, 1963 G. W. FLOYD 3,097,777

TAPE HANDLING APPARATUS

Filed Jan. 9, 1961 2 Sheets-Sheet 1

INVENTOR.
GEORGE W. FLOYD
BY Christie, Parker & Hale
ATTORNEYS.

July 16, 1963 G. W. FLOYD 3,097,777

TAPE HANDLING APPARATUS

Filed Jan. 9, 1961 2 Sheets-Sheet 2

INVENTOR.
GEORGE W. FLOYD
BY Christie, Parker & Hale
ATTORNEYS.

United States Patent Office 3,097,777
Patented July 16, 1963

3,097,777
TAPE HANDLING APPARATUS

George W. Floyd, Los Angeles, Calif., assignor, by mesne assignments, to Rheem Electronics Corporation, Los Angeles, Calif., a corporation of California Filed Jan. 9, 1961, Ser. No. 81,574
7 Claims. (Cl. 226—39)

This invention relates to tape handling apparatus and more particularly to control arrangements for braking or stopping information tapes for a tape reader.

A common form of record member for use in digital control arrangements and the like is an information bearing tape whereon binary coded information is recorded. The binary coded information may be recorded in terms of perforations arranged in transverse groups on the tape and spaced apart a preselected distance. The information that is recorded on the tapes is generally utilized for programming or commanding a control arrangement such as a machine tool control, for example. The recorded information must then be processed or read from the tapes at relatively high speeds for introduction into the digital control. Consistent with the need for high speed reading, the tape apparatus must be stopped at such a high speed to prevent the loss of any recorded information and allow the digital control arrangement to sequentially follow the program or command recorded on the information tapes when the apparatus is restarted. Also, with the information tapes traveling at a high speed when a stop signal is initiated, the tape must be immediately stopped so that no new information is delivered to the digital control circuit. Some control applications require that the information tape be stopped either at the group of information that is present in the reading station at the time of the stop signal to allow the tape reading circuitry to function as an information storage register without utilizing additional storage circuitry therefor. Other control applications require that the reading circuitry be cleared of any information at the time of stopping and which stopping requires that the tape be stopped at an interval immediately after the group of information that is present in the reading station at the time of the stop signal and before the next group of informaion arrives or in the space between information groups or characters as they are commonly termed.

The present invention provides an improved and economical control arrangement for braking or stopping an information tape that may be stopped either on the group of information located in the reading station of the apparatus or in the area between successive information groups, that is, without the loss of any information. In general, the braking arrangement comprises a continuously rotating drive member arranged with a jam or pinch member that frictionally engages the drive member for advancing tape received therebetween. The jam member is controlled by means of a solenoid that is selectively controlled to be de-energized at a high speed to cause the immediate disengagement of the jam and drive members. The control arrangement utilizes the combination of a relatively large impedance element and a feedback-storage arrangement for decreasing the decay time of the solenoid winding and thereby decreasing the release time of the jam member.

Specifically, the solenoid winding is arranged with a transistor switching circuit that is adapted to energize and de-energize the solenoid. An amplifier functions to control the conductive condition of the solenoid switching circuit and is arranged in an opposite conductive condition therefrom. The switching transistor circuit is further arranged with a feedback transistor amplifier circuit arranged in parallel circuit arrangement therewith and which feedback circuit includes a capacitor coupled to the solenoid coil in common with a large series resistive impedance element for dissipating the energy thereof. The feedback amplifying circuit is arranged in the same conductive condition as the control amplifier and thereby the opposite conductive condition from the switching circuit to provide the feedback signal during the stopping interval. The addition of the capacitor in the feedback circuit (contrasted with the use of the dissipating resistor alone) functions to temporarily store the energy of the solenoid winding and then to discharge same through the resistive impedance element to thereby decrease the decay time of the solenoid winding by a factor of approximately two relative to the use of the resistive element alone. To further aid the quick stopping action of the tape, the apparatus is provided with braking means for continuously frictionally engaging the tape as it is advanced through the reading station and which is also immediately effective upon de-energization of the solenoid. By this arrangement the information bearing tape may be stopped at the desired time by applying a stopping signal to the control amplifier to change its conductive condition. The stopping signal may be derived from a plurality of signals including one of the information signals derived from the information tape to provide the stopping signal.

These and other features of the present invention may be more fully appreciated when considered in the light of the following specification and drawings, in which.

Figure 1:
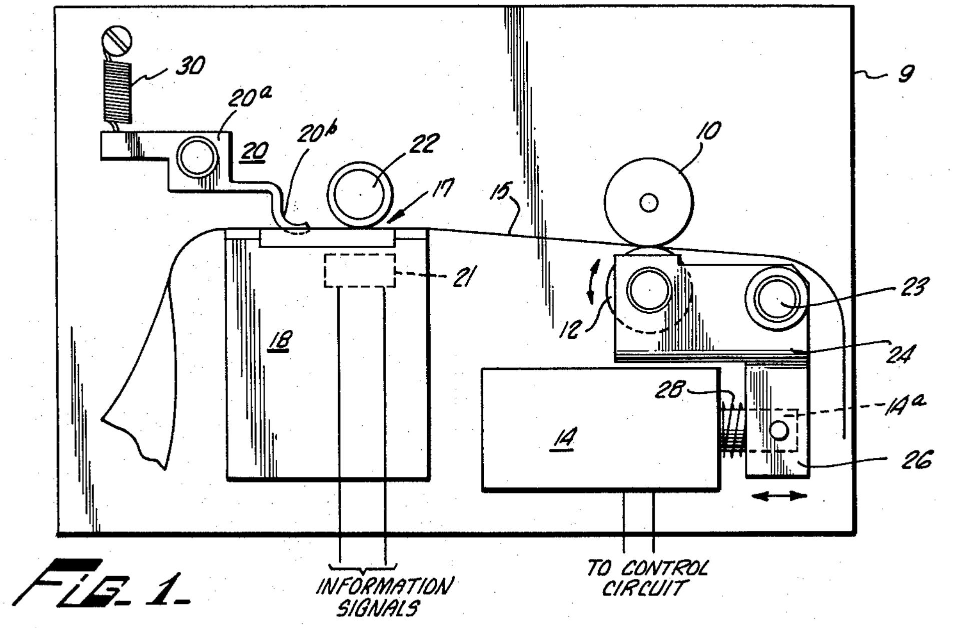
FIG. 1 is a front elevational view of the panel of the tape apparatus showing the braking arrangement and embodying the invention.
Figure 2:
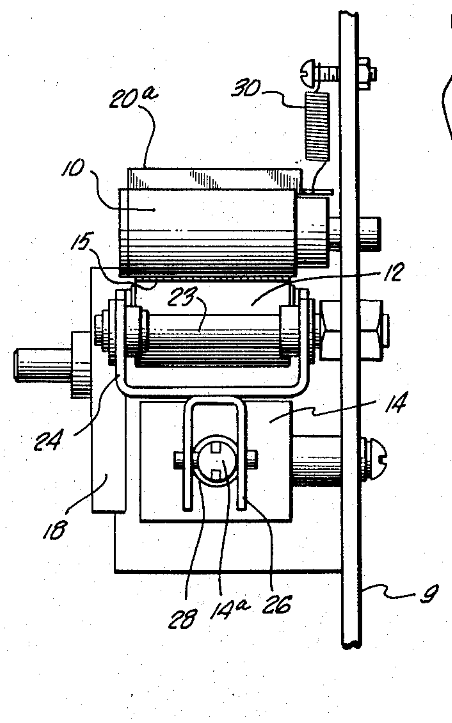
FIG. 2 is a right-side elevational view of the arrangement of FIG. 1.

Now referring to FIGS. 1 and 2 in particular, the invention will be described in detail. The general mechanical arrangement of the braking means is shown in FIG. 1 as mounted on a panel 9 for the tape apparatus and includes tape driving means which comprises a continuously rotating cylindrical drive member or capstan 10 arranged with a rotatable jam member or pinch roller 12 and which pinch member is pivotally mounted to be selectively controlled by the solenoid 14 to be swung or rocked into and out of frictional driving engagement with the drive member 10 to correspondingly drive or stop an information bearing tape 15 received therebetween. The information bearing tape 15 is shown as a length of perforated paper tape that extends through the reading station 17 mounted in a tape guide block 18. The information tape 15 is passed over the guide block 18 and which block is adapted to align the tape and is arranged with a braking means 20 shown as continuously frictionally engaging the tape for holding it tightly to the block at all times. The reading station 17 may comprise any conventional perforated tape sensing device and, for the purposes of this invention, should be considered including a photocell sensing element 21 for reading the recorded information or perforations on the tape arranged with a light source shown as a lamp 22 arranged to provide a band of light in alignment with the sensing element.

The jam roller 12 is mounted by means of a rockable shaft 23 secured at one end to the frame 9 of the tape reader mounting a rocker plate 24 to be rotatable therewith. The jam roller 12 is journalled to the rocker 24 at its opposite end to be swingable therewith. The rocker 24 is rigidly secured by means of a U-shaped member 26 to be responsive to the energization and de-energization of the solenoid 14 and for this purpose the member 26 is fastened to the free end of the solenoid shaft 14ª. A heavy spring 28 is mounted on the free end of the solenoid shaft 14ª inwardly of the U-shaped member 26. The above arrangement functions so that the movements of the solenoid shaft 14ª pivots the rocker 24 about the shaft 23 to cause the jam roller 12 to engage and disengage from the drive roller 10. The jam roller 12 is swung in a clockwise fashion to frictionally engage the drive roller 10 only when the solenoid 14 has been energized.

The braking means 20 is shown as a pivotally mounted member 20ª secured to the frame 9 of the tape apparatus and defined with an L-shaped shoe 20ᵇ mounted to continuously frictionally engage the tape 15 as it is driven over the guide block 18. The shoe 20ᵇ is continuously urged into engagement with the surface of the guide block 18 or the information tape 15 thereon by means of a compression spring 30 having one end mounted thereto and the opposite end secured to the frame 9.

Figure 3:
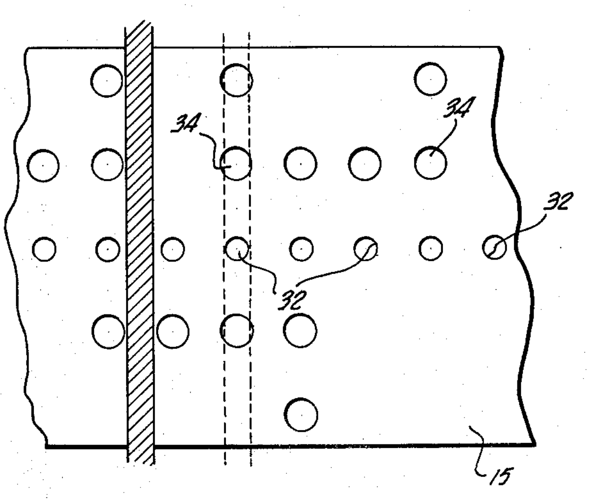
FIG. 3 is a partial diagrammatic representation of an information bearing tape for use in the apparatus of FIG. 1.

Before continuing with the description of the control circuitry for the tape apparatus, a brief discussion of the format of a typical perforated paper tape will be considered. The tape 15 is shown with the usual longitudinally aligned spaced apart feed or drive perforations 32 and a plurality of information perforations 34. The information perforations 34 are transversely aligned on the tape 15 with a feed perforation 32 and each such grouping of perforations 34 are considered as an information group or character. The feed perforations 32 are generally smaller in diameter than the information perforations 34. The light from the source 22 is focused on the sensing element 21 of the reading station 17 to provide a band of light of predetermined light level and a width substantially corresponding to the diameter of the feed perforation 32. Therefore, when this band of light is aligned with an information group, each of the aligned information perforations 34 will also be within this band whereby a group of electrical information signals may be derived corresponding to each such perforation. The spacing between the information groups and the width of this reading band is such that when the band falls between a group of characters, as shown in FIG. 3 by the cross-hatched band, neither an information perforation 34 or a feed perforation 32 will be covered by the reading band. Of course it will be recognized that the light is not restricted to the reading band nor is it clearly defined so that a certain amount of light flux will overlap and illuminate the adjacent areas, particularly when a transparent information tape is being employed. This light level of the reading band is controlled to allow it only to be effective on the sensing element 21 while it is in substantial alignment with an information group. For this purpose, a reading control arrangement of the type disclosed in my earlier filed patent application entitled "Record Reader," bearing Serial No. 78,747 and filed on November 27, 1960, and assigned to the same assignee as the present invention can be used. Reference to this co-pending application for the details of such a reading circuit may be had.

In a practical example, information would be recorded on a tape 15 at a density of ten characters per inch, whereby the distance between the perforations 32 would be on the order of one-tenth of an inch. Therefore, the reading band of light would be approximately .052 inch in width to provide the desired reading action described. In addition, for commercial applications, the information tape should be advanced at a rate on the order of one hundred characters per second, or ten inches per second, and the braking means should have the ability to stop the tape either on an information group, as shown by the dotted band of FIG. 3, or on the adjacent area between information groups as shown by the cross-hatched light band. In any event, it is essential that the tape 15 be stopped before a new group of information is presented to the sensing element 21.

Figure 4:
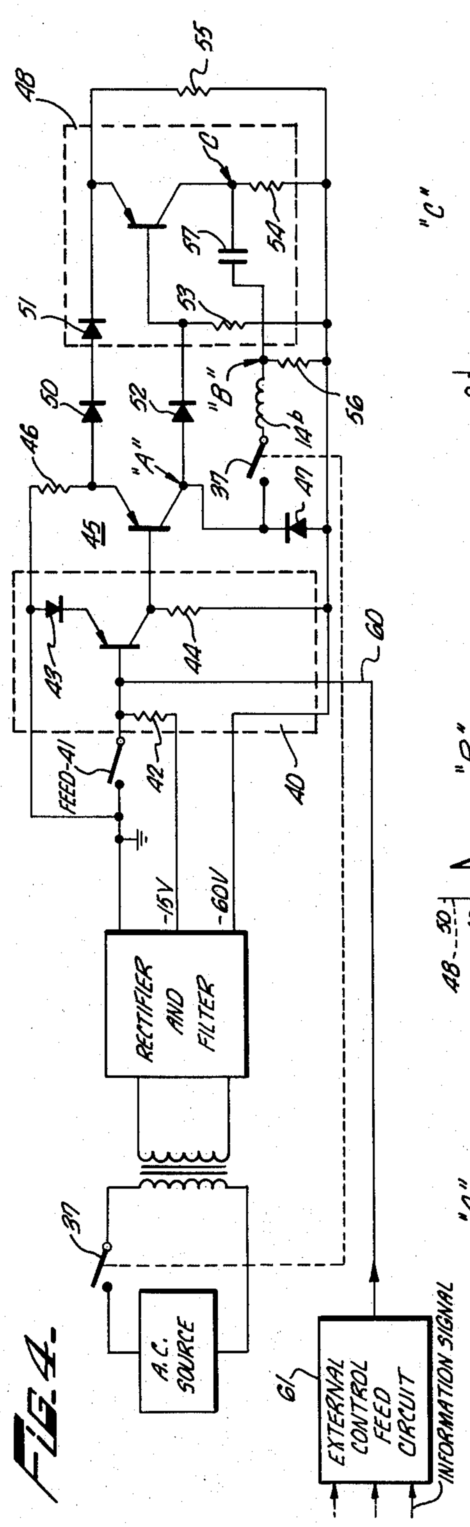
FIG. 4 is a schematic illustration, partially in block diagram form, of the braking control circuit of the invention.

Now referring to FIG. 4, the circuit for controlling the solenoid 14 will be described. The control circuit is shown with a conventional power supply that is manually controlled by a power switch 37 that also includes a ganged switch in series with the solenoid winding 14ᵇ to prevent any creeping of the tape 15 due to the inductive surge that results when the power is turned on or off and thereby maintains the tape in the stopped position. A control amplifier 40, shown as a transistor amplifier having its base electrode connected to ground potential through a tape feed or drive switch 41 and with a base resistor 42 connected to a negative source of potential of an intermediate level, on the order of 15 volts. The emitter electrode for the control amplifier 40 is connected directly to ground by means of a diode 43, while the collector electrode is connected by means of a dropping resistor 44 to the negative terminal of the power source, shown as 60 volts. A switching circuit 45 is coupled to the control amplifier 40 to be conductively controlled thereby and, in turn, to energize and de-energize the solenoid winding 14ᵇ. The arrangement of the switching amplifier 45 with the control amplifier 40 is such that it is maintained in the opposite conductive condition from the control amplifier 40. The emitter electrode of the switching circuit 45 is connected to ground by means of a bias resistor 46, while the collector thereof is connected to the negative terminal by means of an asymmetrically conducting device or a diode 47 having its cathode connected to the collector electrode. The bias resistor 46 is proportioned to allow the switching circuit 45 and a feedback amplifier 48 to be correctly cut-off or rendered non-conductive. The diode 47 prevents over voltage on the transistor for circuit 45 and its junction with the collector thereof is identified by the reference letter "A." The base electrode of the transistor switch 45 is directly connected to the collector electrode for the amplifying transistor 40 in common with the bias resistor 44.

The feedback amplifier 48 is coupled in parallel circuit relationship with the switching amplifier 45. The feedback amplifier 48 is also shown in the form of a transistor amplifier having its emitter electrode coupled to the emitter electrode of the switching amplifier 45 by means of a pair of series connected similarly poled diodes 50 and 51 with the anode of the diode 50 connected to the emitter of the switching circuit 45 and the cathode of the diode 51 connected to the emitter of the feedback amplifier 48. These diodes 50 and 51 further assure that the amplifier 48 is properly biased for the cut-off condition. The base electrode of the feedback amplifier 48 is connected by means of an asymmetrical device shown as a diode 52 to the collector electrode of the switching circuit 45. The anode of the diode 52 is connected to the collector of the amplifier circuit 45, while its cathode is connected to the base electrode of the feedback amplifier 48. This same base electrode is also connected to the negative terminal of the power source by means of a dropping resistor 53. The emitter and collector electrodes of amplifier 48 are also connected to this same 60 volt terminal by means of a dropping resistor 54 and resistor 55.

The solenoid winding 14ᵇ is arranged in series circuit relationship with a resistive impedance element 56 and which resistive impedance is proportioned to have a high impedance value relative to the impedance of the solenoid winding 14ᵇ. To this same end, a capacitor 57 is coupled between the common junction of the solenoid winding 14ᵇ and the impedance device 56, the junction is identified by the reference letter "B," and the common junction of the resistor 54 and the collector electrode of the feedback amplifier 48, identified by the reference letter "C."

A control lead 60 is connected directly to the base of the control amplifier 40 for application of a tape stop signal thereto. The tape stop signal may be derived from an external control feed circuit represented by a block 61, which may be a coincidence circuit which has been adapted to indicate the time coincidence of preselected signals and which signals include one of the information signals derived from the reading station 17, as one of the input signals or conditions to be satisfied in order to generate a stop signal on the lead wire 60. Alternatively, the information signal may be directly applied to the lead wire 60.

The conductive arrangement of the control circuit with the tape stopped places the control amplifier 40 in a conductive condition and the switching circuit 45 is correspondingly in a non-conductive condition, and thereby, the solenoid winding $14^b$ is de-energized. At this same time, the feedback amplifier 48 is conductive or in the same state as the amplifier 40. It will be recognized that the de-energization of the solenoid winding $14^b$ has caused the jam roller 12 to be rotated in a counterclockwise direction, as shown in FIG. 1, whereby it is out of engagement with the drive roller 10. The information tape 15 may be advanced through the reading station 17 either manually by closing the feed switch 41 to place the base electrode of the amplifier 40 at ground potential, or automatically by applying a ground potential to the control amplifier 40 by means of the lead wire 60. In the same fashion, the tape may be stopped by either opening the switch 41 or removing the ground potential from the lead wire 60 to allow the control amplifier 40 to be rendered nonconductive.

Figure 6:
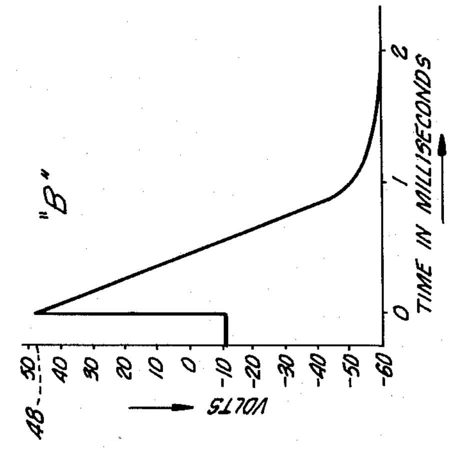
Figure 7:
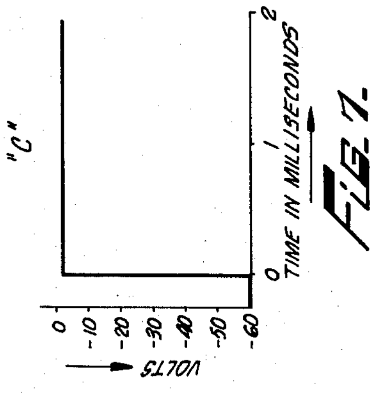

If it now be assumed that a stop signal is provided on the lead wire 60 or the feed switch 41 is opened while the tape 15 is being driven, the stop signal will cause the amplifier 40 to become conductive and, accordingly, switch the circuit 45 from its conductive condition to a nonconductive condition. The solenoid winding $14^b$ will also tend to become de-energized at this time since it is energized by means of the output or collector-base circuit of the switching circuit 45 and the feedback amplifier 48 will, in turn, be rendered conductive. Just prior to the time that the stop signal is applied to the lead wire 60 the voltages at the designated points "A," "B," and "C" are a the levels indicated before "zero" time on the respective graphs of FIGS. 5 through 7. The time of application of the stop signal is designated as "zero" time.

Figure 5:
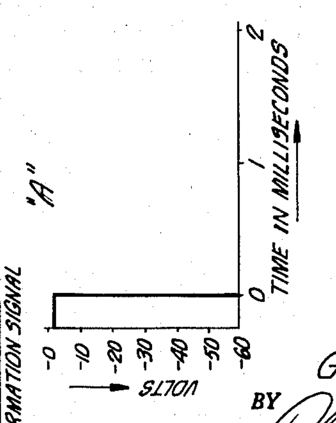
FIGS. 5, 6, and 7 are graphical illustrations of the potentials plotted against time in the indicated points in the circuit of FIG. 4.

Immediately after the amplifier 45 has become nonconductive, the potential of point "A" will be minus 60 volts, as indicated by FIG. 5. This renders the diode 52 nonconductive, allowing the resistive impedance 53 to cause the amplifier 48 to become conductive. The point "C" then changes potential from minus 60 volts to approximately 0 volts. A 60 volt pulse is then applied to point "B" through the capacitor 57, changing the potential of point "B" from minus 12 volts to plus 48 volts. Therefore, the potential that is applied across the solenoid winding $14^b$ at this interval is 60 plus 48 volts, or a total of 108 volts, and which increased potential causes the current in the solenoid winding $14^b$ to rapidly reach zero or to substantially decrease the decay time of the current in the solenoid winding and thereby causing the solenoid to be de-energized or drop out in a very short interval.

To more fully understand the circuit action it should be noted that de-energizing a solenoid or any electromagnetic device is accomplished by removing the energy stored in the winding as a result of current flowing in the winding. Prior art circuits remove this energy by dissipating it as heat in the winding or in external impedances such as in the resistive impedance device 56. In accordance with this invention, the energy is removed not only by the usual dissipation of energy in the solenoid winding $14^b$ and the impedance element 56 but also by storing part of the energy in the capacitor 57. The energy stored in the capacitor 57 is later dissipated in the resistive impedance 56 after the solenoid winding $14^b$ has become de-energized. The temporary storage of this energy in the capacitor 57 provides the decrease in de-energization time and is an important feature of this invention.

It should be noted at this point that in prior art circuits a large resistor functioning as the resistor 56 is employed but without the utilization of the feedback amplifier 48 and capacitor 57. If the above circuit was operated without the capacitor 57 and the feedback amplifier 48, the voltage across the solenoid winding $14^b$ would be only 48 volts. Thus the additional 60 volts obtained by the addition of the above circuit elements causes the current decay time in the solenoid winding $14^b$ to be decreased by more than a factor of two since the decay time is represented by the expression $$\frac{di}{dt}=\frac{E}{L}$$

This decrease of decay time has been accomplished without increasing the actual drive voltage to the solenoid winding $14^b$.

Another aspect of the control circuit is the use of a 12 volt, 18 ohm solenoid winding $14^b$ in series with the resistor 56 which is proportioned to have a resistance of 75 ohms but arranged in a 60 volt supply line to reduce the de-energization time over that provided when a 12 volt supply circuit is utilized. This feature not only acts to decrease the decay time when the solenoid is de-energized but also to decrease the rise time of the current in the solenoid winding $14^b$, or the time that the solenoid picks up when it is energized.

It will now be recognized that high speed withdrawal of the jam roller 12 results from placing a voltage of opposite potential across the solenoid winding $14^b$. When the current through the solenoid winding $14^b$ reaches zero there is a tendency for it to flow therethrough in the opposite direction due to any voltage present at point "B," the junction of the solenoid winding $14^b$ and the capacitor 57. The circuit of the present invention, however, includes a self-limiting feedback arrangement through the inclusion of the diode 52 coupling the output circuit of the switching circuit 45 and the base-collector circuit of the feedback amplifier 48 whereby a circuit path is defined from point "B" through the solenoid winding $14^b$ to point "A" and, by means of the diode 52, into the base-collector circuit of the feedback amplifier 48. If, for example, the capacitance of the capacitor 57 were selected to have a relatively high capacitance, the voltage pulse applied to point "B" would persist for a time interval that is longer than the time required for the current in the solenoid winding $14^b$ to reach zero. Under these circuit conditions, at the time the current through the solenoid winding $14^b$ reaches zero, any voltage that exists at the point "B" tends to cause current to flow through the solenoid winding $14^b$ towards the point "A." However, with the presence of the diode 47 in the circuit, the only circuit paths for the reverse current is through the de-energized switching circuit 45 or in the reverse direction through the diode 47. However, when the voltage at the point "A" approaches ground potential, this current can flow through the diode 52 and into the base-collector circuit of the feedback amplifier 48. This reverse current flows into the feedback amplifier 48 and tends to reduce the current thereof causing the potential of the collector electrode thereof to assume a lower potential in turn removing the voltage pulse that has set up this reverse current flow through the diode 52. Therefore, the reverse current through the solenoid winding $14^b$ is limited to a very small current value and will not effect the above described de-energization characteristic of the solenoid. This self-limiting feature allows the capacitor 57 to be proportioned to maintain a large voltage during the decay interval of the solenoid winding 14ᵇ and yet not cause a sufficient reverse current to flow to effect its operation.

In a practical application the stop signal 60 may be automatically provided by an external control feed circuit 61. As indicated hereinabove, the control circuit 61 may be responsive to an information signal as one of its conditions to provide the desired stop signal. The information signal may be derived from any of the information channels on the tape 15 or even a signal corresponding to a feed perforation 32. If it is desired to stop the tape 15 when an information group is in the reading station 17, the leading edge of the information signal may be employed to provide this stop signal, that is, the signal is differentiated and the differentiated leading edge is used to trigger the control circuit to provide the stop signal. To this same end, if it is desired to stop the tape 15 between information groups, the same information signal may be utilized and differentiated whereby the differentiated signal corresponding to the trailing edge is utilized to trigger the feed circuit 61 and then provide the stop signal at the correct interval.

It should now be evident that the above invention has advanced the state of the tape handling art through the provision of an improved control arrangement for starting and stopping the tape.

What is claimed is:

1. In tape handling apparatus for information bearing tape having information recorded thereon in spaced apart groups including braking means for continuously frictionally engaging the tape, a continuously rotating cylindrical drive member, a rotating cylindrical jam member positioned adjacent said drive member for frictional driving contact with said drive member whereby to receive and drive tape arranged therebetween, means for pivotally mounting the jam member adjacent to and out of driving contact with said drive member, solenoid means including an energizable winding connected to said latter means for swinging the jam member into and out of frictional driving contact with said drive member, and control circuit means connected for selectively energizing and de-energizing said solenoid means, said control circuit means including a switching circuit connected to energize and de-energize the solenoid winding and arranged to be energized for placing the jam member in driving contact with said drive member, an impedance device connected to the solenoid winding for dissipating the energy thereof, a feedback amplifier connected in parallel circuit relationship with said switching circuit and controlled thereby to be in the opposite conductive condition therefrom, means for delivering a stop signal to said switching circuit, a capacitor connected between said feedback amplifier in common with the impedance device and the solenoid winding to receive and temporarily store the energy from said winding and then discharge same through the impedance device to cause the solenoid means to be quickly de-energized and thereby the tape to be quickly stopped with the aid of said braking means.

2. In tape handling apparatus for information bearing tape whereon the information is arranged in spaced apart groups including braking means for continuously frictionally engaging the tape, a continuously rotating cylindrical drive member, a rotatable cylindrical jam member positioned adjacent said drive member for frictional driving contact with said drive member whereby to receive and drive tape arranged therebetween, means for pivotally mounting the jam member adjacent to and out of driving contact with said drive member, solenoid means including an energizable winding connected to said latter means for swinging the jam member into and out of frictional driving contact with said drive member to correspondingly drive and stop the tape, a tape reading station arranged for reading the information on the tape and providing a plurality of electrical information signals corresponding to each group of information presented thereto as the tape is driven, and control circuit means connected for selectively energizing and de-energizing the solenoid winding, said control circuit means comprising amplifying means arranged in a non-conductive condition when the tape is being driven and to be rendered conductive for stopping the tape, stop signalling means responsive to a plurality of signals including a signal derived from said information tape to provide a stop signal connected to said amplifying means for rendering same conductive for stopping the tape before another signal may be derived therefrom, transistor switching circuit means connected to be conductively controlled by said amplifying means to assume the opposite conductive condition therefrom and connected to correspondingly energize and de-energize the solenoid winding, an impedance element connected in series circuit relationship with the solenoid winding and having a large impedance value relative to the solenoid winding, and transistor feedback amplifying means connected in parallel circuit relationship with said switching circuit and arranged to assume the same conductive condition as said first-mentioned amplifying means, said feedback amplifier including a capacitor connected thereto and to the junction of the solenoid winding and the impedance element.

3. In tape handling apparatus for information bearing tape whereon the information is recorded by means of spaced apart groups of perforations transversely aligned thereon, including braking means for continuously frictionally engaging the tape, a continuously rotating cylindrical drive member, a rotatable cylindrical jam member positioned adjacent said drive member for frictional driving contact with said drive member whereby to receive and drive tape arranged therebetween, means for pivotally mounting the jam member adjacent to and out of driving contact with said drive member, solenoid means including an energizable winding connected to said latter means for swinging the jam member into and out of frictional driving contact with said drive member to correspondingly drive and stop the tape, a tape reading station arranged for reading the information on the tape and providing a plurality of electrical information signals corresponding to each recorded perforation, and control circuit means connected for selectively energizing and de-energizing the solenoid winding, said control circuit means comprising amplifying means arranged in a non-conductive condition when the tape is being driven and to be rendered conductive for stopping the tape, stop signalling means responsive to a plurality of signals including a signal derived from said information tape to provide a stop signal connected to said amplifying means for rendering same conductive for stopping the tape, switching circuit means connected to be conductively controlled by said amplifying means to assume the opposite conductive condition therefrom and connected to correspondingly energize and de-energize the solenoid winding, a resistive impedance element connected in series circuit relationship with the solenoid winding and having a large impedance value relative to the solenoid winding, feedback amplifying means connected in parallel circuit relationship with said switching circuit and arranged to assume the same conductive condition as said first-mentioned amplifying means, said feedback amplifier including a capacitor connected thereto and to the junction of the solenoid winding and the impedance element, the impedance element functioning to dissipate the energy of the solenoid winding upon de-energization thereof in response to a stop signal while the capacitor momentarily stores the energy to cause the solenoid to quickly release the jam member from its driving position to thereby stop the tape with the aid of the first-mentioned means and then discharges same through the impedance element.

4. In tape handling apparatus for information bearing tape including braking means for continuously frictionally engaging the tape, a continuously rotating cylindrical drive member, a continuously rotatable cylindrical jam member positioned adjacent said drive member for frictional driving contact with said drive member whereby to receive and pass tape therebetween, means including solenoid means having an energizable coil connected to said jam member for swinging same into and out of frictional driving contact with said drive member, and control circuit means connected for selectively energizing and de-energizing said solenoid coil, said control circuit means including amplifying means arranged to be in a non-conductive condition when the tape is being driven and to be rendered conductive for stopping the tape, stop signalling means providing a stop signal connected to said amplifying means for rendering same conductive for stopping the tape, switching circuit means including a transistor having an emitter, collector and base electrode connected to be conductively controlled by said amplifying means whereby it assumes an opposite conductive condition therefrom, said solenoid coil is connected to the collector-base circuit of the transistor to be energized and de-energized thereby, a source of potential, a resistive impedance element having a large impedance value relative to the solenoid coil connected to the remaining end of the solenoid coil and one of the terminals of said source of potential, means for connecting the base-emitter circuit of the transistor to said one terminal of the source of potential, feedback amplifying means including a transistor having an emitter, collector and base electrode, means for connecting the emitter electrodes of said transistors in common whereby the feedback transistor assumes the same conductive conduit as the amplifying means, means for connecting the base-collector circuit of the feedback transistor to said one terminal of the source of potential and to the base-collector circuit of the switching transistor, a capacitor coupled to the collector electrode of the feedback transistor and the junction of said solenoid coil and the resistive element for temporarily storing the coil energy upon the de-energization thereof and to discharge same through said impedance element to cause the rapid decay of the current through the solenoid coil, and means for connecting the emitter electrode of the second transistor to the one terminal of said source.

5. In tape handling apparatus for information bearing tape as defined in claim 4 wherein the means for connecting the base-collector circuit of the feedback transistor to the base-collector circuit of the switching transistor includes an asymmetrical device poled to allow the passage of the current through the solenoid winding in the reverse direction and thereby a decrease in the feedback current to thereby limit the reverse current.

6. In tape handling apparatus for information bearing tape including a continuously rotating cylindrical drive member, a rotatable cylindrical jam member positioned adjacent said drive member for frictional driving contact with said drive member whereby to receive and pass tape loosely therebetween, means for pivotally mounting the jam member adjacent to and out of driving contact with said drive member, solenoid means connected to said latter means for swinging the jam member into and out of frictional driving contact with said drive member, and control circuit means connected for selectively energizing and de-energizing said solenoid means, said control circuit means including a first transistor having an emitter, collector and base electrode, said solenoid means is connected to the collector electrode of the transistor and to be energized and de-energized thereby, a source of potential, an impedance element having a relatively large impedance value connecting to the remaining end of the solenoid means and one of the terminals of said source of potential, means for connecting the base electrode of the transistor to said one terminal of the source of potential, means for connecting the emitter electrode to the other terminal of said source, means for applying a stop-tape signal to the emitter-base circuit of the transistor, a second transistor having an emitter, collector and base electrode, means including an asymmetrical device connected between the collector electrode of the first transistor and the base electrode of the second transistor, means including an asymmetrical device connecting the emitter electrodes of said transistors, impedance means connected to the collector electrode of said second transistor and said one terminal of the source of potential, a capacitor coupled to the collector electrode of said second transistor and the junction of said solenoid means and said first-mentioned impedance element, means for connecting the base electrode of the second transistor to the one terminal of said source and means for connecting the emitter electrode of the second transistor to the one terminal of said source.

7. In tape handling apparatus for information bearing tape having information recorded thereon in spaced apart groups as defined in claim 1 including circuit means connected in parallel circuit relationship with the solenoid winding, feedback amplifier and capacitor and defined for limiting the feedback current through the solenoid winding in the reverse direction and yet allowing the quick de-energization of the solenoid winding.

References Cited in the file of this patent

UNITED STATES PATENTS

| | | |
|---|---|---|
| 2,575,034 | Tyler et al. | Nov. 13, 1951 |
| 2,600,648 | Herrick | June 17, 1952 |
| 2,728,878 | Sperr | Dec. 27, 1955 |
| 2,864,609 | Trimble | Dec. 16, 1958 |
| 2,877,012 | Angel et al. | Mar. 10, 1959 |
| 2,900,132 | Burns et al. | Aug. 18, 1959 |
| 3,002,671 | Brumbaugh et al. | Oct. 3, 1961 |